(12) United States Patent
Lee et al.

(10) Patent No.: US 7,505,397 B2
(45) Date of Patent: Mar. 17, 2009

(54) METHOD FOR TRANSMITTING/RECEIVING DATA IN MOBILE COMMUNICATION SYSTEMS USING AN OFDMA SCHEME

(75) Inventors: Yong-Hwan Lee, Seoul (KR); June Moon, Seoul (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 623 days.

(21) Appl. No.: 11/154,763

(22) Filed: Jun. 16, 2005

(65) Prior Publication Data

US 2005/0281189 A1    Dec. 22, 2005

(30) Foreign Application Priority Data

Jun. 16, 2004    (KR) ...................... 10-2004-0044722

(51) Int. Cl.
*H04J 11/00*    (2006.01)
(52) U.S. Cl. ...................................... 370/208; 370/329
(58) Field of Classification Search ................. 370/203, 370/208, 328, 329, 330
See application file for complete search history.

(56) References Cited

U.S. PATENT DOCUMENTS

2005/0025039 A1*    2/2005    Hwang et al. ............... 370/206
2005/0041623 A1*    2/2005    Livet et al. .................. 370/332

FOREIGN PATENT DOCUMENTS

| EP | 1 164 740 | 12/2001 |
| EP | 1164740 A2 * | 12/2001 |
| EP | 1 246 423 | 3/2002 |

OTHER PUBLICATIONS

Kanghee, Hongku and Kim "Providing Quality of Service in Adaptive Resourse Allocation for OFDMA System", IEEE pp. 1612-1615, 2004.*

* cited by examiner

*Primary Examiner*—Christopher Kelley
*Assistant Examiner*—Mulugeta Mengesha
(74) *Attorney, Agent, or Firm*—The Farrell Law Firm, PC

(57) ABSTRACT

A method for transmitting data in a mobile communication system using an OFDMA scheme. The method includes dividing an entire frequency band of the mobile communication system into a plurality of sub-carrier frequency bands, generating a plurality of segments each of the plurality of segments having a preset number of sub-frequency bands and a preset number of time intervals, and each of the plurality of segments having a frequency domain and a time domain, classifying the plurality of segments into multiple types of segments in consideration of data characteristics, determining combinations of signal transmitting and receiving schemes to be applied to each of the type of segments in consideration of the data characteristics, and selecting one of the multiple types of segments for transmitting data in consideration of the data characteristics when the data is generated for transmission.

3 Claims, 7 Drawing Sheets

| | Segment Type-I | Segment Type-II | Segment Type-III | Segment Type-IV |
|---|---|---|---|---|
| Traffic/user type | • NRT/Cell center | • RT/Cell center | • NRT/Cell boundary | • RT/Cell boundary |
| Scheduling | • Opportunistic<br>• 3D scheduling (freq/time/space) | • Non-opportunistic<br>• QoS scheduling | • Opportunistic scheduling<br>• DCA | • Non-opportunistic<br>• QoS scheduling |
| Link adaptation | • Fast AMC/$A^2$ IR | • Slow AMC<br>• H-ARQ with synchronous exponential IR | • Fast AMC/$A^2$ IR | • Slow AMC<br>• H-ARQ with synchronous exponential IR |
| MIMO (Antenna) | • SDM (V-BLAST/SVD) | • SDM (V-BLAST) | • Opportunistic BF | • STC (ST-BICM)<br>• Ant hopping |
| Transmission schemes | • No FH, No CDM | • FH | • NO FH, NO CDM | • FH & CDM |
| CSI estimation | • Instantaneous SIR estimation | • CE + interpolation | • Instantaneus SIR estimation | • CE + interpolation |

FIG. 7

METHOD FOR TRANSMITTING/RECEIVING DATA IN MOBILE COMMUNICATION SYSTEMS USING AN OFDMA SCHEME

PRIORITY

This application claims priority to an application entitled "Method for Transmitting/Receiving Data In Mobile Communication System Using OFDMA scheme" filed in the Korean Intellectual Property Office on Jun. 16, 2004 and assigned Serial No. 2004-44722, the contents of which are hereby incorporated by reference.

BACKGROUND OF THE INVENTION

1. Field of the Invention

The present invention relates to a mobile communication system using an Orthogonal Frequency Division Multiple Access (OFDMA) scheme, which will be referred to as an OFDMA mobile communication system, and more particularly to a method for transmitting or receiving data by means of differential combinations of signal transmitting and receiving schemes according to data characteristics.

2. Description of the Related Art

In a $4^{th}$ generation (4G) mobile communication system, which is the next generation mobile communication system, research has been actively pursued to provide users with services having various qualities of service (QoS) at a transmission speed of about 100 Mbps. Apart from previous mobile communication systems providing only wireless mobile communication services, the 4G mobile communication system is aimed at providing integrated wire/wireless communication services by efficiently combining a wire communication network with a wireless communication network. As a result, the wireless communication network requires technology capable of transmitting mass storage data at the same or similar rate and capacity of a wire communication network.

In the 4G mobile communication system, an Orthogonal Frequency Division Multiple (OFDM) scheme has been actively researched for transmitting data through wire/wireless channels at high speeds. The OFDM scheme, which transmits data using multi-carriers, is a special type of a Multi-Carrier Modulation (MCM) scheme in which a serial input symbol sequence is converted into parallel symbol sequences and the parallel symbol sequences are modulated with a plurality of mutually orthogonal sub-carriers (or sub-carrier channels) before being transmitted. The OFDM scheme is similar to a Frequency Division Multiplexing (FDM) scheme, but it can achieve optimal transmission efficiency in high speed data transmission by transmitting a plurality of sub-carriers while maintaining orthogonality therebetween. Further, the OFDM scheme is quite efficient in its use of frequencies and is tolerant to multi-path fading, so that it can achieve optimal transmission efficiency in high speed data transmission.

Furthermore, the OFDM scheme has advantages as follows: it is efficient in its use of frequencies by using an overlapping frequency spectrum; it is tolerant to frequency selective fading; it can reduce Inter-Symbol Interference (ISI) by means of a guard interval; it enables a hardware structure of an equalizer to be simply designed; and it is tolerant to impulse noise. Therefore, the OFDM scheme has been generally employed in a mobile communication system.

According to the OFDM scheme, spectrums between sub-carriers (i.e., sub-carrier channels) overlap while maintaining mutual orthogonality, so that spectrum efficiency is good. Further, in the OFDM scheme, modulation is accomplished by an Inverse Fast Fourier Transform (IFFT) and demodulation is accomplished by a Fast Fourier Transform (FFT). A multiple access scheme based on the OFDM scheme as described above includes an OFDMA scheme which allocates some of entire sub-carriers to a specific terminal for use. The OFDMA scheme does not require a spreading sequence for band-spreading and may dynamically change a set of sub-carriers allocated to a specific terminal according to a fading characteristic of a wireless transmission line.

As a result, the 4G mobile communication system as described above has been developed in consideration of a software aspect for developing various contents and a hardware aspect for developing a wireless access scheme having high spectrum efficiency to provide best QoS.

Hereinafter, the hardware aspect considered in the 4G mobile communication system will be described.

Generally, factors obstructing a high speed service of high quality in wireless communication are caused by channel environments. In the wireless communication, the channel environments frequently change due to power variation of received signals caused by fading in addition to Additive White Gaussian Noise (AWGN), shadowing, a Doppler effect by movement and frequent velocity variation of a terminal, or interference by other terminals and multi-path signals. Accordingly, to provide a high wireless data packet service, another developed technology capable of adaptively coping with the channel change has been required in addition to schemes provided by the existing 2G or 3G mobile communication system. For example, a scheme (e.g., an Adaptive Modulation and Coding (AMC) scheme and a Hybrid Automatic Retransmission Request (HARQ) scheme) employed in existing mobile communication systems adaptively copes with the channel change, thereby improving entire performance of the system greatly.

Even though various schemes including the AMC scheme and the HARQ scheme as described above are employed, a fundamental problem (i.e., shortage of radio resources) in wireless communication is not solved. Accordingly, it is desirable to continuously research and develop a multiple access scheme having high spectrum efficiency, which enables subscriber capacity to be maximized and high speed transmission indispensable for a multimedia service to be accomplished. Further, it is desirable to provide a new multiple access scheme which has good spectrum efficiency and can consider data characteristics to provide a high speed packet data service of high quality.

SUMMARY OF THE INVENTION

Accordingly, the present invention has been made to solve the above-mentioned problems occurring in the prior art, and it is an object of the present invention to provide a method for transmitting or receiving data by means of differential combinations of signal transmitting and receiving schemes according to data characteristics, i.e. user location and service species, in an OFDMA mobile communication system.

It is another object of the present invention to provide a method for transmitting or receiving data by means of differential combinations of signal transmitting and receiving schemes according to QoS in an OFDMA mobile communication system.

It is further another object of the present invention to provide a method for transmitting or receiving data by means of differential combinations of signal transmitting and receiving schemes according to channel quality in an OFDMA mobile communication system.

It is still another object of the present invention to provide a segment scheduling method employing differential combinations of signal transmitting and receiving schemes according to data characteristics an OFDMA mobile communication system.

To accomplish the aforementioned objects, according to one aspect of the present invention, there is provided a method for transmitting data in a mobile communication system using an Orthogonal Frequency Division Multiple Access (OFDMA) scheme, the method including dividing an entire frequency band of the mobile communication system into a plurality of sub-carrier frequency bands, generating a plurality of segments each of the plurality of segments having a preset number of sub-frequency bands and a preset number of time intervals, and each of the plurality of segments having a frequency domain and a time domain, classifying the plurality of segments into multiple types of segments in consideration of data characteristics; determining combinations of signal transmitting and receiving schemes to be applied to each of the types of segments in consideration of the data characteristics; and selecting one of the multiple types of segments for transmitting data in consideration of the data characteristics of data when the data is generated for transmission.

To accomplish the aforementioned objects, according to another aspect of the present invention, there is provided a method for receiving data in a mobile communication system using an Orthogonal Frequency Division Multiple Access (OFDMA) scheme, the method including the steps of: dividing an entire frequency band of the mobile communication system into a plurality of sub-carrier frequency bands; receiving a notification that data is to be received through one of multiple segments, which are classified into multiple types of segments and occupied by a preset number of sub-frequency bands and a preset number of time intervals, wherein the segments having a frequency domain and a time domain, and combinations of signal transmitting and receiving schemes are applied to the segments according to data characteristics selecting a combination of the signal transmitting and receiving schemes corresponding to a type of a segment to receive the data from among the combinations of the signal transmitting and receiving schemes; receiving the data through the segment according to the selected combination of the signal transmitting and receiving schemes.

BRIEF DESCRIPTION OF THE DRAWINGS

The above and other objects, features, and advantages of the present invention will be more apparent from the following detailed description taken in conjunction with the accompanying drawings, in which:

FIG. 7 is a diagram illustrating combinations of signal transmitting and receiving schemes applied according to types of a segment in the differential segment structure of FIG. 2.

DETAILED DESCRIPTION OF THE PREFERRED EMBODIMENT

Preferred embodiments of the present invention will be described in detail herein below with reference to the accompanying drawings. In the following description, a detailed description of known functions and configurations incorporated herein will be omitted when it may obscure the subject matter of the present invention.

Figure 1:
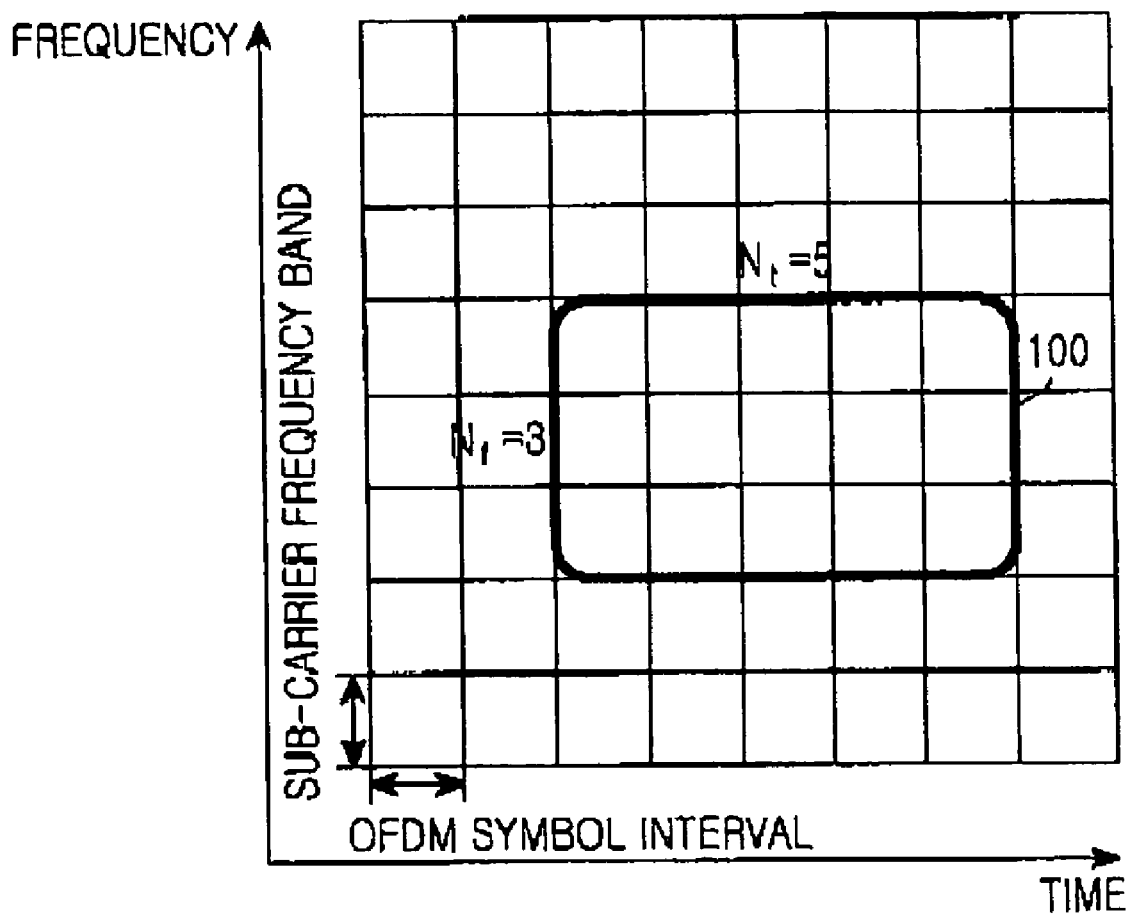
FIG. 1 is a graph schematically illustrating a segment allocation in an OFDMA mobile communication system according to an embodiment of the present invention.

FIG. 1 is a graph schematically illustrating a segment allocation in an OFDMA mobile communication system according to an embodiment of the present invention. Referring to FIG. 1, the horizontal axis represents a time domain and the vertical axis represents a frequency domain. The OFDMA mobile communication system divides a total bandwidth into a plurality of sub-carrier frequency bands for use. As illustrated in FIG. 1, a portion will be defined as a segment, which occupies a preset $N_t$ number of OFDM symbol intervals in the time domain and a preset $N_f$ number of sub-carrier frequency bands in the frequency domain. Accordingly, one segment may transmit $N_t \times N_f$ number of modulated OFDM symbols. It is noted that the number $N_t$ of the OFDM symbols and the number $N_f$ of the sub-carrier frequency bands, which constitute the segment, may be variously set according to conditions of the OFDMA mobile communication system. As a result, the OFDMA mobile communication system includes a plurality of segments in a preset time interval.

Figure 2:
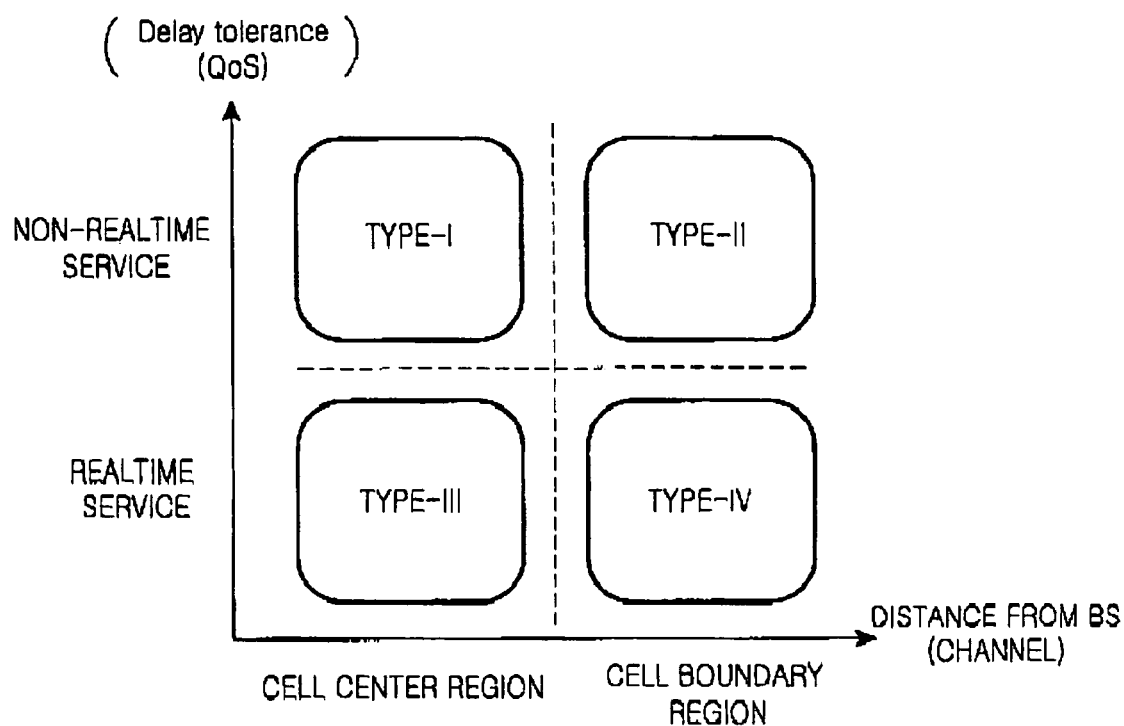
FIG. 2 is a diagram schematically illustrating differential segment types supported by an OFDMA mobile communication system according to an embodiment of the present invention.

FIG. 2 is a diagram schematically illustrating differential segment types supported by the OFDMA mobile communication system according to an embodiment of the present invention. Referring to FIG. 2, as described in FIG. 1, the present invention proposes a new segment structure. In particular, the present invention differentiates signal transmitting and receiving schemes, which are applied to a segment, according to data characteristics, thereby realizing a differential segment structure. The data characteristic is generated according to a delay tolerance condition of data, that is, a QoS level condition, and a condition for a distance from a base station, that is a channel quality condition. The QoS level condition is a condition used for identifying a realtime (RT) service or a non-realtime (NRT) service and the channel quality condition is a condition used for identifying a cell center region or a cell boundary region. The present invention proposes four segment types, that is, a first type 'type I' to a fourth type 'type IV'. Each of the segment types will be described in detail later.

Figure 3:
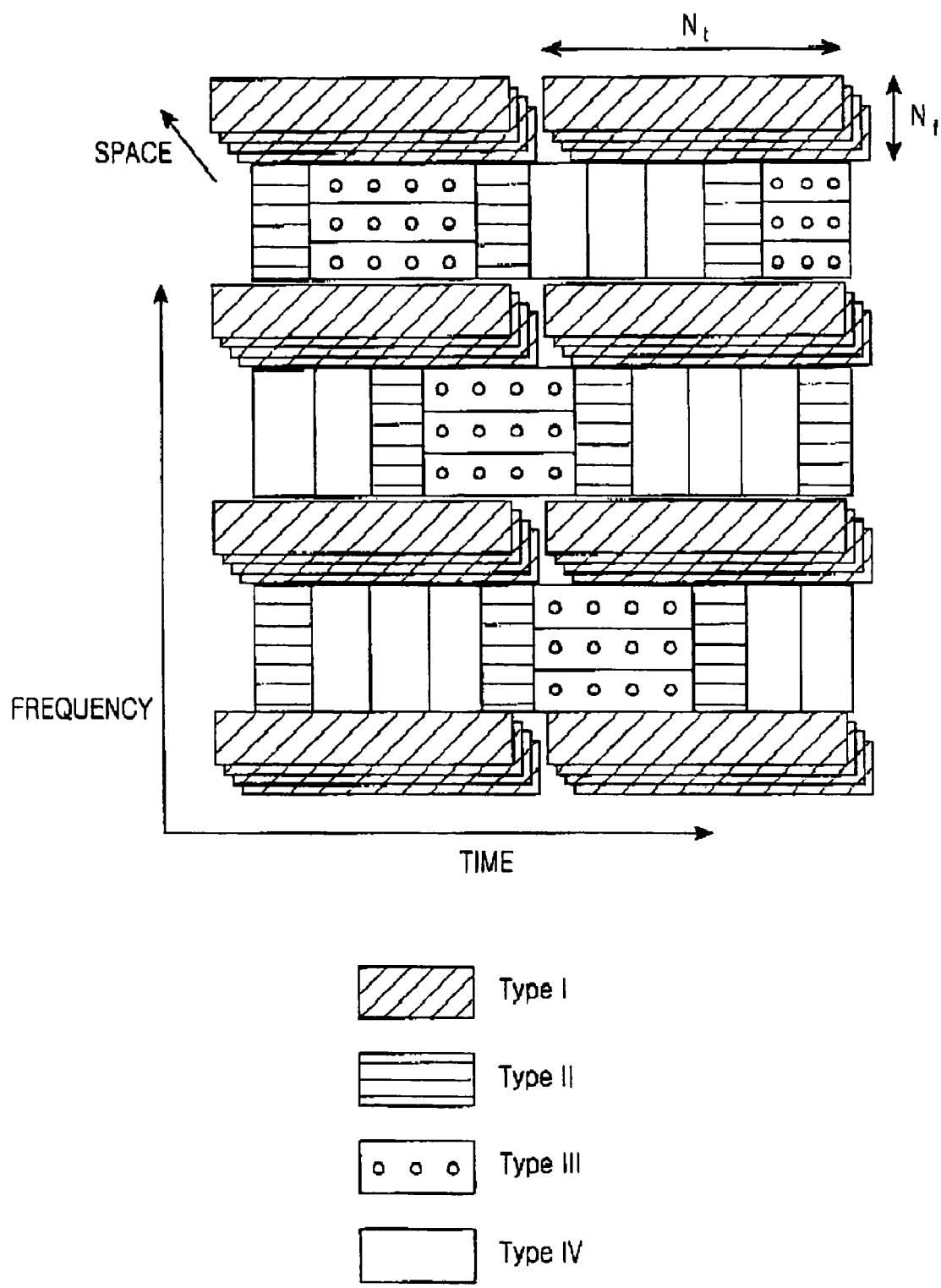
FIG. 3 is a diagram schematically illustrating a resource map structure employing the differential segment structure in FIG. 2 of an OFDMA mobile communication system.

FIG. 3 is a diagram schematically illustrating the resource map structure employing the differential segment structure of FIG. 2 in the OFDMA mobile communication system. FIG. 3 shows the differential segment structure as described in FIG. 2, that is, the resource map structure when different types of segments are practically mapped with physical channels. The different types of segments are structured so that a signal transmitting and receiving scheme corresponding to a predetermined data characteristic can be applied. Accordingly, each of the segments may have different sizes and shapes according to its types, which has a two dimensional (2D) resource map structure constructed by a frequency domain and a time domain.

Further, the resource map structure employing the differential segment structure may have different shapes as well as the shape as illustrated in FIG. 3, because terminals corresponding to each segment type and traffic, that is, distribution of user data, may change depending on conditions of the OFDMA mobile communication system. Herein, the resource map structure has a shape for maximizing transmission efficiency of the OFDMA mobile communication system.

In addition, different resource map structures are provided between neighbor cells to minimize Inter-Cell Interference (ICI). The resource map structure as illustrated in FIG. 3 considers only segments for a traffic channel; segments for a control channel may separately exist. Because the control channel is stably transmitted to a cell boundary region regardless of priorities of terminals, a separate resource map structure is considered based on a link level diversity scheme.

Hereinafter, parameters for determining each of the four segment types will be described with reference to Tables 1 and 2.

TABLE 1

|  | Cell center | Cell boundary |
| --- | --- | --- |
| Delay spread | Small | Large |
| Frequency selectivity | Mild | Severe |
| Frequency diversity source | Lack | Abundant |
| Frequency diversity scheme | Ineffective | Effective |
| ICI fluctuation | Mild | Severe |
| ICI averaging scheme | Ineffective | Effective |
| Interference estimation | Easy | Difficult |
| Space diversity scheme | Ineffective (antenna correlation) | Effective (due to scatterer) |
| Code Division Multiplexing (CDM) | Ineffective (code orthogonality) | Effective (additional diversity) |
| Scheduling policy | Opportunistic | Non-opportunistic |
| CIR improvement | Ineffective | Effective |
| Transmission policy | Parallel transmission | Diversity transmission |
| Diversity order | Low | High |
| Multiple Input Multiple Output (MIMO) strategy | Spatial Division Multiplexing (SDM) | Space-Time Code (STC) |

As descried above, the segment type is determined according to the QoS level condition and the channel quality condition. Table 1 shows the parameters that are considered according to the channel quality condition in determining the segment type. The parameters will be described in detail through a comparison of a cell center region and a cell boundary region. Herein, the parameter considered through the comparison of the cell center region and the cell boundary region includes a delay spread, a frequency selectivity, a frequency diversity source, a frequency diversity scheme, an ICI fluctuation, an ICI averaging scheme, an interference estimation, a space diversity scheme, a CDM, an efficient scheduling policy, a CIR (Carrier-to-interference ratio) improvement, a transmission policy, a diversity order, a MIMO strategy, etc.

(1) Delay Spread

The delay spread is relatively small in the cell center region and relatively large in the cell boundary region.

(2) Frequency Selectivity

The frequency selectivity is mild in the cell center region and severe in the cell boundary region.

(3) Frequency Diversity Source

The frequency diversity source is lacking in the cell center region and abundant in the cell boundary region.

(4) Frequency Diversity Scheme

The cell center region is ineffective and the cell boundary region is effective when the frequency diversity scheme is applied.

(5) ICI Fluctuation

The ICI fluctuation is mild in the cell center region and severe in the cell boundary region.

(6) ICI Averaging Scheme

As described above, because the ICI fluctuation is mild in the cell center region, the cell center region is ineffective when the ICI averaging scheme is applied. Because the ICI fluctuation is severe in the cell boundary region, the cell boundary region is effective when the ICI averaging scheme is applied.

(7) Interference Estimation

The interference estimation is easy in the cell center region and difficult in the cell boundary region.

(8) Space Diversity Scheme

The cell center region is ineffective and the cell boundary region is effective when the space diversity scheme is applied.

(9) CDM

The cell center region is ineffective and the cell boundary region is effective when the CDM is applied, because the CDM causes additional diversity gain and ICI averaging effect in the cell boundary region.

(10) Scheduling Policy

An opportunistic scheduling policy is easy to apply in the cell center region as the scheduling policy and a non-opportunistic scheduling policy is easy to apply in the cell boundary region as the scheduling policy.

(11) CIR Improvement

The cell center region is ineffective and the cell boundary region is effective in terms of CIR improvement.

(12) Transmission Policy

A parallel transmission policy is effective in the cell center region and a diversity transmission policy is effective in the cell boundary region in terms of transmission policy.

(13) Diversity Order

A low diversity order may be applied to the cell center region and a high diversity order applied to the cell boundary region. The opportunistic scheduling policy is easy to apply in the cell center region and the non-opportunistic scheduling policy is easy to apply in the cell boundary region.

(14) MIMO Strategy

The SDM scheme is effective in the cell center region and the STC scheme is effective in the cell boundary region.

TABLE 2

|  | Realtime | Non-realtime |
| --- | --- | --- |
| Latency requirement | Low | High |
| Approach | Fading mitigation | Fading exploitation |
| Efficient scheduling policy | Non-opportunistic (QoS) | Opportunistic |
| Diversity form | Link-level diversity | Multi-user diversity |
| MIMO strategy | STC | SDM |

Table 2 shows the parameters considered according to the QoS level condition in determining the segment type. The parameters will be described through a comparison of a realtime service and a non-realtime service. Herein, the parameter considered through the comparison of the realtime service and the non-realtime service includes a latency requirement, an approach, an efficient scheduling policy, a link-level diversity scheme, a diversity form, a MIMO strategy, etc.

(1) Latency Requirement

The latency requirement is low in the realtime service and high in the non-realtime service.

(2) Approach

A fading mitigation is effective in the realtime service and a fading exploitation is effective in the non-realtime service.

(3) Efficient Scheduling Policy

A opportunistic scheme is effective in the non-realtime service. A non-opportunistic scheme according to a QoS level is effective in the realtime service.

(4) Diversity Form

A Link-level diversity scheme is effective in the realtime service and a Multi-user diversity scheme is effective in the non-realtime service.

(5) MIMO Strategy

A STC scheme is effective in the realtime service and a SDM scheme is effective in the non-realtime service.

To provide multimedia traffic having various QoS levels, it is indispensable to generate combinations of heterogeneous signal transmitting and receiving schemes according to criteria most importantly considered in a physical layer of the OFDMA mobile communication system, and to commonly manage the generated combinations of the signal transmitting and receiving schemes together with a control of an upper layer higher than a Medium Access Control (MAC) layer. A process of constructing the combinations of the signal transmitting and receiving schemes is referred to as a joint optimization method and a method of interlocking the combinations of the signal transmitting and receiving schemes generated by the joint optimization method with an upper layer is referred to as a cross-layer optimization method.

Figure 4:
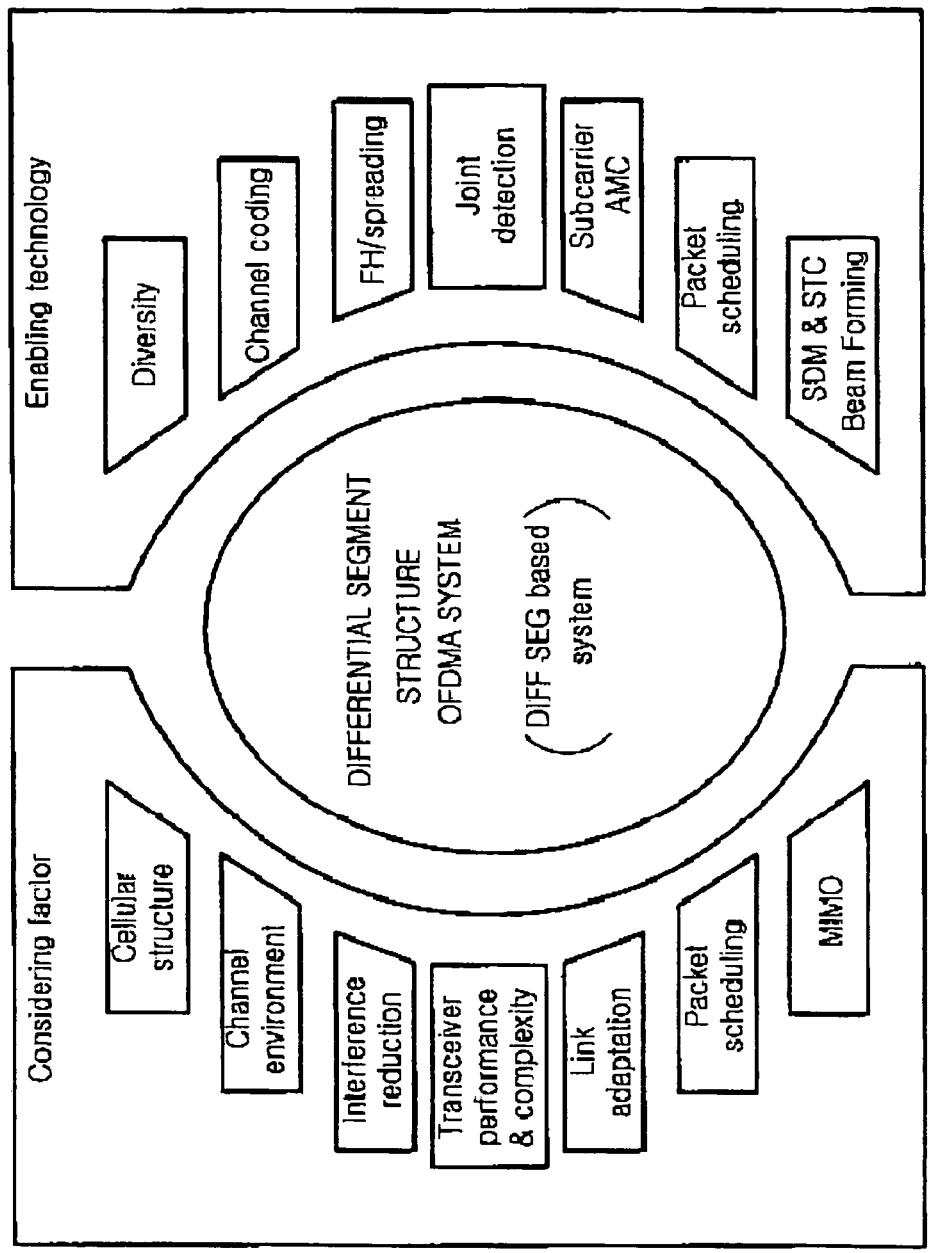
FIG. 4 is a diagram schematically illustrating a joint optimization process for determining combinations of signal transmitting and receiving schemes applied to the differential segment structure of FIG. 2.

FIG. 4 is a diagram schematically illustrating the joint optimization process for determining the combinations of the signal transmitting and receiving schemes applied to the differential segment structure of FIG. 2. Referring to FIG. 4, considering factors for determining the combinations of the signal transmitting and receiving schemes applied to the differential segment structure include a cellular structure, channel environments, interference reduction, transceiver performance & complexity, a link adaptation, a packet scheduling, and a MIMO strategy.

An enabling technology capable of being applied to the considering factors includes a diversity scheme, a channel coding scheme, a Frequency Hopping (FH)/spreading scheme, a joint detection scheme, a sub-carrier Adaptive Modulation and Coding (AMC) scheme, a packet scheduling policy, an SDM & STC scheme, a beamforming scheme, etc.

Figure 5:
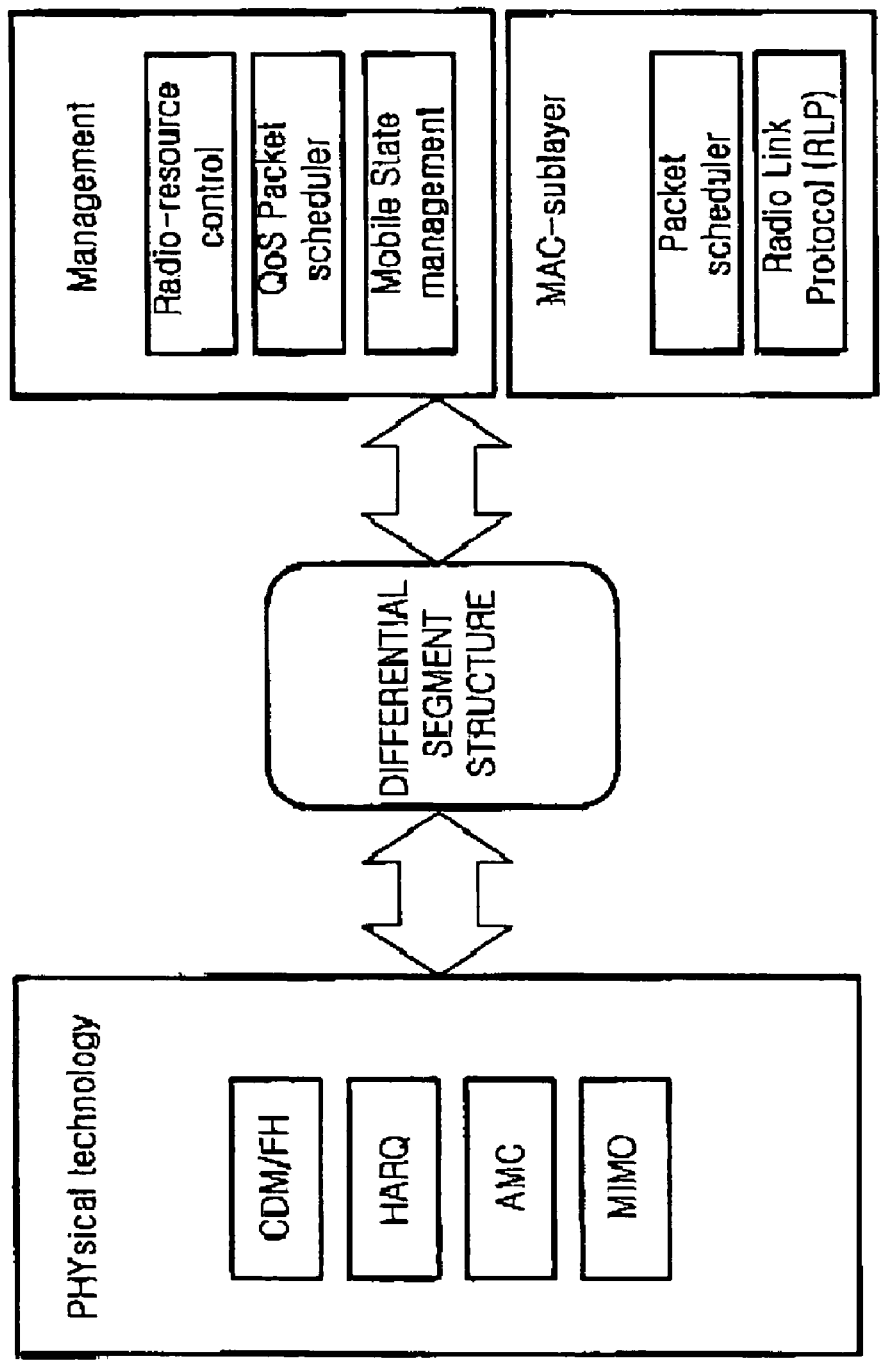
FIG. 5 is a diagram schematically illustrating a cross-layer optimization process for interlocking combinations of signal transmitting and receiving schemes applied to the differential segment structure of FIG. 2 with an upper layer.

FIG. 5 is a diagram schematically illustrating a cross-layer optimization process for interlocking the combinations of the signal transmitting and receiving schemes applied to the differential segment structure of FIG. 2 with the upper layer. Referring to FIG. 5, the signal transmitting and receiving scheme considered in a lower layer (i.e., a physical layer) of the OFDMA mobile communication system includes a "CDM/FH" scheme, a Hybrid Automatic Retransmission Request ("HARQ") scheme, an "AMC" scheme, a "MIMO" strategy, etc. The upper layer combines various signal transmitting and receiving schemes capable of being applied to the lower layer to apply the signal transmitting and receiving schemes to the differential segment structure, in consideration of a "Radio Resource Control (RRC) aspect, a QoS packet scheduling aspect, and a mobile state management aspect. Further, the upper layer controls a packet scheduling and a radio link by means of a packet scheduler and a Radio Link Protocol (RLP).

Figure 6:
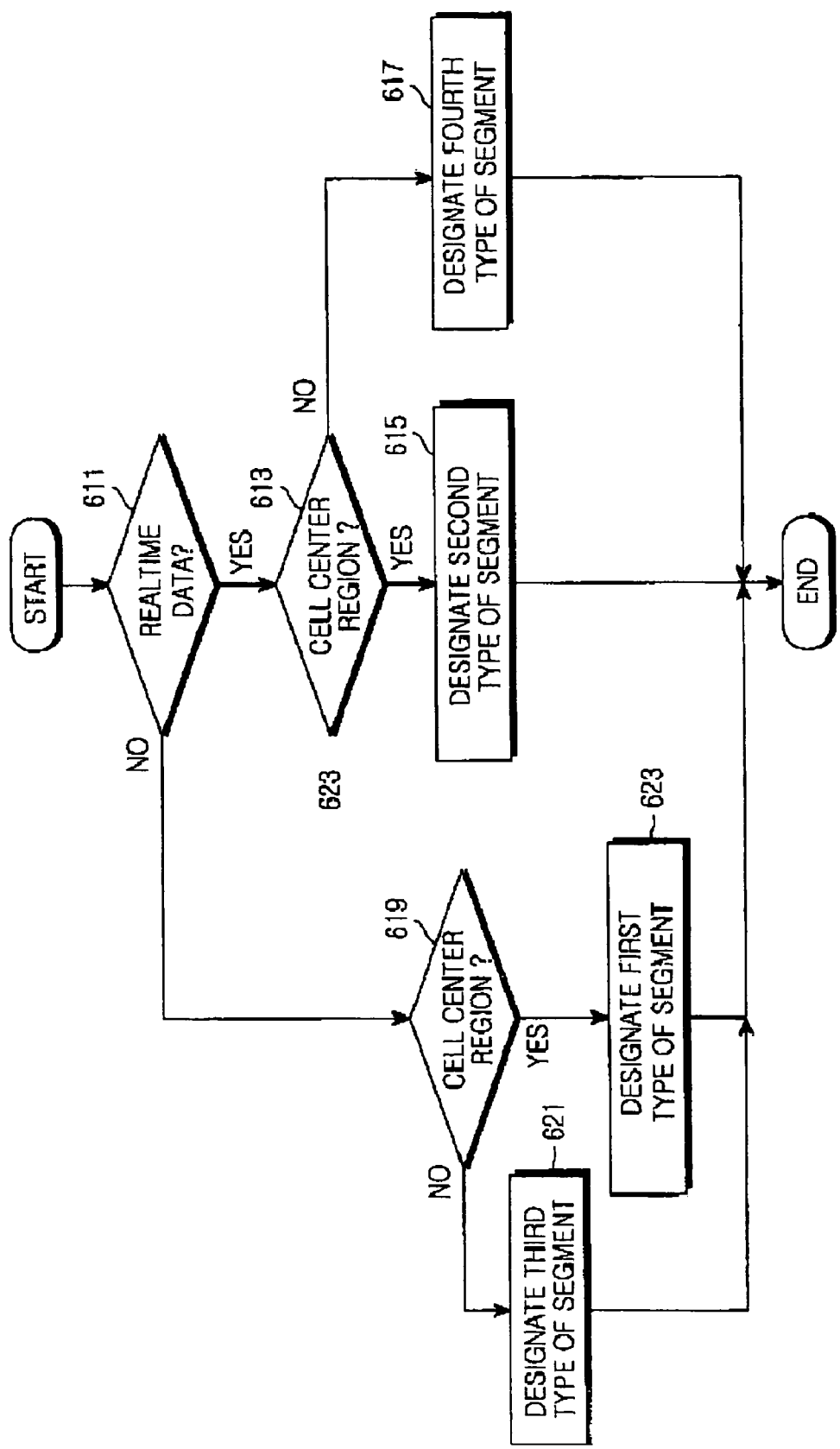
FIG. 6 is a flow diagram illustrating a process for allocating a segment in the differential segment structure of FIG. 2.

FIG. 6 is a flow diagram illustrating a process for allocating a segment in the differential segment structure of FIG. 2.

However, before describing FIG. 6, a base station of the OFDMA mobile communication system should recognize location information of terminals in advance to manage the differential segment structure. The location information of the terminals may be detected by means of a channel state measurement scheme.

Referring to FIG. 6, in step 611, when user data to be transmitted are generated, a scheduler of the base station determines if the user data is realtime service data. When the user data realtime service data, step 613 is performed. In step 613, the scheduler determines if the terminal exists in a cell center region by means of measured CIR. When the terminal exists in the cell center region, step 615 is performed. In step 615, the scheduler designates a segment to transmit the user data as a second type segment. Then, the procedure ends.

As a result of the determination in step 613, when the terminal does not exist in the cell center region, that is, when the terminal exists in a cell boundary region, step 617 is performed. In step 617, the scheduler designates a segment to transmit the user data as a fourth type segment. Then, the procedure ends.

As a result of the determination in step 611, when the user data is not realtime service data, that is, when the user data is non-realtime service data, step 619 is performed. In step 619, the scheduler determines if the terminal exists in the cell center region. In case of the non-realtime service data, the reason for considering the ICI as well as the CIR is to improve efficiency of resources by performing a scheduling based on channel conditions rather than QoS. When the terminal does not exist in the cell center region, step 621 is performed. In step 623, the scheduler designates a segment to transmit the user data as a third type segment. Then, the procedure ends.

As a result of the determination in step 619, when the terminal does not exist in the cell center region, that is, when the terminal exists in the cell boundary region, step 623 is performed. In step 623, the scheduler designates a segment to transmit the user data as a first type segment. Then, the procedure ends.

FIG. 7 is a diagram illustrating combinations of signal transmitting and receiving schemes applied according to types of a segment in the differential segment structure of FIG. 2.

Before describing FIG. 7, to map the aforementioned differential segment structure with a physical channel, it is desirable to maximally support the combinations of the signal transmitting and receiving schemes corresponding to predetermined environments. FIG. 7 shows the combinations of the signal transmitting and receiving schemes applied to the first to the fourth type segment.

Hereinafter, the combination of the signal transmitting and receiving schemes applied to the first type segment will be described.

The first type segment (segment type I) is a segment for supporting a non-realtime (NRT) service targeting a terminal in a cell center region, and selects a transmission scheme based on an opportunistic scheduling. As described above, because the terminal in the cell center region has a relatively large CIR, a parallel transmission scheme is efficient. Accordingly, an SDM scheme such as a vertical-Bell Labs Layered Space Time (BLAST) scheme is used. Because the first type segment can be divided according to space as well as time and frequency, each spatially divided segment may transmit user data targeting different terminals.

There is an increased necessity for a scheme of multiplexing user data targeting different terminals with spatial parallel channels generated by the SDM scheme and transmitting the multiplexed user data. Further, a link level diversity scheme such as an FH scheme and a CDM scheme is not applied to the first type segment, so that gain of the opportunistic scheduling can be maximized.

Accordingly, in the first type segment, $N_f$ in the segment is reduced to minimize an appliance of the link level diversity scheme. Further, because an AMC scheme may be applied relatively exactly, a necessity of using a HARQ scheme is reduced. Therefore, it is not necessary to consider a retransmission delay in the HARQ scheme. As a result, $N_t$ in the segment relatively increases. However, if $N_t$ in the segment relatively increases, a scheduling interval also increases. Therefore, a delay of a channel quality feedback channel increases, so that a terminal velocity capable of being supported in the first type segment is reduced.

To support the opportunistic scheduling, each terminal provides feedback Channel Quality Information (CQI) for all segments located on a frequency, time and a space to a base station in a relatively short-term, that is, instantaneously. The instant CQI may include a CIR, transmit rate etc. Then, the base station performs a scheduling operation for the first type segment with reference to instant CQI fedback from each terminal. When the number of the terminals increases, a resource allocation for a channel (CQI feedback channel) feedbacking the instant CQI increases. Therefore, the total transmission efficiency of the OFDMA mobile communication system deteriorates. As a result, a resource map is designed considering tradeoff due to increase in the fedback CQI and the gain of the opportunistic scheduling.

The combinations of the signal transmitting and receiving schemes applied to the first type segment as illustrated in FIG. 7 are obtained by combining six signal transmitting and receiving schemes below. The six signal transmitting and receiving schemes may be summarized as follows:

(1) Traffic/User type: NRT traffic/cell center region;
(2) Scheduling policy: an opportunistic scheme, a three-dimensional (3D frequency, time and space) scheduling scheme;
(3) Link adaptation scheme: a fast AMC scheme, an Adaptive Asynchronous Incremental Redundancy (AAIR) scheme;
(4) MIMO strategy: an SDM scheme {V-BLAST scheme and Singular Value Decomposition (SVD) scheme};
(5) Transmission scheme: No FH, No CDM ; and
(6) Channel State Information (CSI) estimation scheme: instantaneous Signal-to-Interference Ratio (SIR) estimation scheme.

Hereinafter, the combination of the signal transmitting and receiving schemes applied to the second type segment will be described.

The second type segment (segment type II) is a segment for supporting an RT service targeting a terminal in a cell center region, and selects a transmission scheme based on a non-opportunistic scheduling. That is, a base station increases a link level diversity order by performing a scheduling according to QoS levels instead of channel states of each terminal, and determines the combinations of the signal transmitting and receiving schemes applied to the second type segment so that transmission tolerant to the channel states can be accomplished.

As described in FIG. 3, the second type segment has a relatively large $N_f$, maximizes a frequency diversity gain by means of a fast FH scheme. Since a parallel transmission policy is effective in the cell center region, an SDM scheme is used and in addition, data of one user are transmitted occupying all spatial parallel channels in order to maximize a link level diversity gain, which is different from a case of the first type segment. Further, a scheme such as a V-BLAST scheme which needs no instant channel information, is to be used. An SVD scheme does not allow this to be used. Further, because a fast fading channel characteristic may be alleviated according to increase in a link level diversity gain, it is desirable to provide a link adaptation scheme corresponding to relatively slow channel change such as path attenuation and shadowing.

That is, because an average CIR during a predetermined time interval may be intermittently fedback and a slow AMC scheme may be applied according to the average CIR, an instantaneous feedback as in the first type segment is not required. Therefore, the amount of CQI information of a feedback channel is reduced. Herein, difference may occur between the average CIR fedback during the predetermined time interval and a CIR of an actually transmitted channel due to change of a CIR, which may happen instantaneously, or shortage of link level diversity resources. This difference may cause transmission errors. However, in case of the realtime data, because performance guarantee is important in the worst channel conditions, a HARQ scheme is employed to prevent the transmission errors from occurring. The HARQ scheme compensates for performance deterioration caused by the AMC scheme and has a superior transmission rate adaptation ability according to characteristics of the HARQ scheme itself. Accordingly, it is indispensable to employ the HARQ scheme for efficient transmission of realtime data.

However, because the realtime data requires high delay requirements, it is desirable to design $N_t$ in the segment to have a small number to minimize retransmission loop delay caused by employing the HARQ scheme. The designing $N_t$ in the segment to have the small number may also be commonly applied to the first type segment. However, when movement velocity of a user is fast, performance deterioration due to an opportunistic scheduling relatively increases. Accordingly, data may be transmitted through the second type segment having a high transmission ability. This can increase flexibility in a system having the differential segment structure.

The combinations of the signal transmitting and receiving schemes applied to the second type segment as illustrated in FIG. 7 are obtained by combining six signal transmitting and receiving schemes that may be summarized as follows:

(1) Traffic/User type: RT traffic/cell center region;
(2) Scheduling policy: a non-opportunistic scheme, a scheduling policy according to QoS levels;
(3) Link adaptation scheme: a slow AMC scheme, a HARQ scheme with a synchronous exponential IR;
(4) MIMO strategy: an SDM scheme(VBLAST), a transmitter is not required channel information;
(5) Transmission scheme: an FH; and
(6) CSI estimation scheme: a Channel Estimation (CE) scheme+an interpolation scheme.

Hereinafter, the combination of the signal transmitting and receiving schemes applied to the third type segment will be described.

The third type segment (segment type III) is a segment for supporting a NRT service targeting a terminal in a cell boundary region, and selects a transmission scheme based on an opportunistic scheduling. That is, a base station decreases a link level diversity order to maximize gain of the opportunistic scheduling. Further, it is desirable to provide an interference average scheme such as an FH scheme and a CDM scheme to cope with ICI characteristics of the cell boundary region. An opportunistic scheduling scheme is connected, such as Dynamic Channel Allocation(DCA) scheme, as the cell boundary regions face each other.

Recent research has focused on an opportunistic beamforming scheme using multiple antennas. The opportunistic beamforming scheme is managed in combination with the opportunistic scheduling policy, has small amount of fedback CQI, and shows an opportunistic interference nulling effect regardless of correlation between antennas. Therefore, the opportunistic beamforming scheme is efficient for the third type segment. However, the opportunistic beamforming scheme has not yet been verified for the possibility of being practically applied to a system. Also, performance comparison with other antenna schemes has not yet been verified.

The combinations of the signal transmitting and receiving schemes applied to the third type segment as illustrated in FIG. 7 are obtained by combining six signal transmitting and receiving schemes that may be summarized as follows:

(1) Traffic/User type: NRT traffic/cell boundary region;
(2) Scheduling policy: an opportunistic scheduling policy and DCA;
(3) Link adaptation scheme: a fast AMC scheme, an AAIR scheme;
(4) MIMO strategy: an opportunistic beamforming scheme;
(5) Transmission scheme: NO FH, NO CDM; and
(6) CSI estimation scheme: instantaneous SIR estimation scheme.

Hereinafter, the combination of the signal transmitting and receiving schemes applied to the fourth type segment will be described.

The fourth type segment (segment type IV) is a segment for supporting a RT service targeting a terminal in a cell boundary region, and selects a transmission scheme based on a non-opportunistic scheduling. That is, because a base station supports transmission based on a link level diversity scheme as in the second type segment and uses a modulation scheme (e.g., Quadrature Phase Shift Keying (QPSK) scheme) of a relatively low order, a CDM scheme may be applied. Further, because a slow AMC scheme and a HARQ scheme may be applied simultaneously, the fourth type segment has the same shape as that of the second type segment.

The combinations of the signal transmitting and receiving schemes applied to the fourth type segment as illustrated in FIG. 7 are obtained by combining six signal transmitting and receiving schemes that may be summarized as follows:

(1) Traffic/User type: RT traffic/cell center region;
(2) Scheduling policy: a non-opportunistic scheduling policy, a scheduling policy according to QoS levels;
(3) Link adaptation scheme: a slow AMC scheme, a HARQ scheme with a synchronous exponential IR;
(4) MIMO strategy: an STC scheme (ST-BICM scheme), an antenna hopping scheme;
(5) Transmission scheme: an FH, a CDM; and
(6) CSI estimation scheme: a CE scheme+an interpolation scheme.

When the base station designates a corresponding type segment to user data to be transmitted and transmits the user data to a corresponding terminal through the designated segment, the terminal receives signals through the designated segment and restores the user data by means of signal transmitting and receiving schemes corresponding to combinations of the signal transmitting and receiving schemes applied to the designated type segment. Herein, it is noted that information for the segment allocated to the terminal and the type of the segment can be transmitted through a separate control channel, a signaling message, etc.

As described above, the present invention proposes a segment structure that employs differential combinations of signal transmitting and receiving schemes according to data characteristics, that is, QoS levels and channel quality, in an OFDMA mobile communication system, thereby maximizing transmission and resource allocation efficiency that vary with environment in the OFDMA mobile communication system.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting data in a mobile communication system using an Orthogonal Frequency Division Multiple Access (OFDMA) scheme, the method comprising the steps of:

dividing an entire frequency band of the mobile communication system into a plurality of sub-carrier frequency bands;

generating a plurality of segments, each of the plurality of segments having a preset number of sub-frequency bands and a preset number of time intervals, and each of the plurality of segments having a frequency domain and a time domain;

classifying each of the plurality of segments into a first type segment when the service quality of the data is the non-realtime service and the terminal targeted by the data is located in the cell center region;

classifying each of the plurality of segments into a second type segment when the service quality of the data is the realtime service and the terminal targeted by the data is located in the cell center region;

classifying each of the plurality of segments into a third type segment when the service quality of the data is the non-realtime service and the terminal targeted by the data is located in the cell boundary region;

classifying each of the plurality of segments into a fourth type segment when the service quality of the data is the realtime service and the terminal targeted by the data is located in the cell boundary region;

determining a three-dimensional scheduling policy of an opportunistic scheme, a link adaptation scheme of a fast Adaptive Modulation and Coding (AMC) scheme and an Adaptive Asynchronous Incremental Redundancy (AAIR) scheme, a Multiple Input Multiple Output (MIMO) strategy of a Spatial Division Multiplexing (SDM) scheme, a transmission scheme of no Frequency Hopping (FH) scheme and no Code Division Multiplexing (CDM) scheme, and a Channel State Information (CSI) estimation scheme of an instantaneous Signal-to-Interference Ratio (SIR) estimation scheme as a combination of signal transmitting and receiving schemes applied to the first type segment;

determining a scheduling policy of a non-opportunistic scheme according to the service quality, a link adaptation scheme of a slow AMC scheme and a Hybrid Automatic Retransmission Request (HARQ) scheme with a synchronous IR, a VBLAST, and a CSI estimation scheme of a Channel Estimation (CE) scheme and an interpolation scheme as the combination of the signal transmitting and receiving schemes applied to the second type segment;

determining a scheduling policy of an opportunistic scheme, a DCA, the link adaptation scheme of the fast AMC scheme and the AAIR scheme, a MIMO strategy of an opportunistic beamforming scheme, the transmission scheme of the no FH scheme and the no CDM scheme; and the CSI estimation scheme of the instantaneous SIR estimation scheme as the combination of the signal transmitting and receiving schemes applied to the third type segment; and determining the scheduling policy of the non-opportunistic scheme, the link adaptation scheme of the slow AMC scheme and the HARQ scheme with the synchronous exponential IR, the MIMO strategy of the STC scheme or the antenna hoping scheme, the transmission scheme of the FH scheme and the CDM scheme, and the CSI estimation scheme of and the CE scheme and the interpolation scheme as the combination of the signal transmitting and receiving schemes applied to the fourth type segment; and selecting one of the multiple types of segments for transmitting data in consideration of a data characteristic of data to be transmitted when the data is generated for transmission, wherein the data characteristic is determined based on at least one of quality of service level conditions and channel quality conditions, and wherein the quality of service level conditions are used for determining if a service quality of the data to be transmitted through the segment is one of a realtime service and a non-realtime service, and the channel quality conditions are used for determining if a terminal is located in one of a cell center region or a cell boundary region, the data targeting the terminal.

2. The method as claimed in claim 1, further comprising the steps of:

processing the data with reference to a type of the selected segment according to the determined combinations of the signal transmitting and receiving schemes; and transmitting the processed data.

3. A method for receiving data in a mobile communication system using an Orthogonal Frequency Division Multiple Access (OFDMA) scheme, the method comprising the steps of:

dividing an entire frequency band of the mobile communication system into a plurality of sub-carrier frequency bands;

receiving a notification that data is to be received through one of multiple segments, which are classified into multiple types of segments and occupied by a preset number of sub-frequency bands and a preset number of time intervals, wherein the segments having a frequency domain and a time domain, and combinations of signal transmitting and receiving schemes are applied to the segments according to data characteristic;

selecting a combination of the signal transmitting and receiving schemes corresponding to a type of a segment to receive the data from among the combinations of the signal transmitting and receiving schemes; and receiving the data through the segment according to the selected combination of the signal transmitting and receiving schemes, wherein the data characteristics are generated based on at least one of quality of service level conditions and channel quality conditions, wherein the quality of service level conditions are used for determining if a service quality of the data received through the segment is one of a realtime service and a non-realtime service, and the channel quality conditions are used for determining if a terminal is located in one of a cell center region and a cell boundary region, the data targeting the terminal, wherein the segment is classified into a first type segment when the service quality of the data transmitted through the segment is the non-realtime service and the terminal is located in the cell center region, the segment is classified into a second type segment when the service quality of the data transmitted through the segment is the realtime service and the terminal is located in the cell center region, the segment is classified into a third type segment when the service quality of the data transmitted through the segment is the non-realtime service and the terminal is located in the cell boundary region, and the segment is classified into a fourth type segment when the service quality of the data transmitted through the segment is the realtime service and the terminal is located in the cell boundary region, and wherein, when the segment is the first type segment, the segment selects as the combination of the signal transmitting and receiving scheme a three-dimensional scheduling policy of an opportunistic scheme, a link adaptation scheme of a fast Adaptive Modulation and Coding (AMC) scheme and an Adaptive Asynchronous Incremental Redundancy (AAIR) scheme, a Multiple Input Multiple Output (MIMO) strategy of a Spatial Division Multiplexing (SDM) scheme, a transmission scheme of no Frequency Hopping (FH) scheme and no Code Division Multiplexing (CDM) scheme, and a Channel State Information (CSI) estimation scheme of an instantaneous Signal-to-Interference Ratio (SIR) estimation scheme;

when the segment is the second type segment, the segment selects as the combination of the signal transmitting and receiving scheme a scheduling policy of a non-opportunistic scheme according to the service quality, a link adaptation scheme of a slow AMC scheme and a Hybrid Automatic Retransmission Request (HARQ) scheme with a synchronous exponential IR, a VBLAST scheme, a transmission scheme of an FH scheme, and a CSI estimation scheme of a Channel Estimation (CE) scheme and an interpolation scheme;

when the segment is the third type segment, the segment selects as the combination of the signal transmitting and receiving scheme the scheduling policy of an opportunistic scheme, a DCA scheme, the link adaptation scheme of the fast AMC scheme and the AAIR scheme, a MIMO strategy of an opportunistic beamforming scheme, the transmission scheme of the no FH scheme and the no CDM scheme, and the CSI estimation scheme of the instantaneous SIR estimation scheme; and when the segment is the fourth type segment, the segment selects as the combination of the signal transmitting and receiving scheme the scheduling policy of the non-opportunistic scheme, the link adaptation scheme of the slow AMC scheme and the HARQ scheme with the synchronous exponential IR, the MIMO strategy of the STC scheme or the antenna hopping scheme, the transmission scheme of the FH scheme and the CDM scheme, and the CSI estimation scheme of and the CE scheme and the interpolation scheme.

* * * * *